United States Patent
Botelho et al.

[19]

[11] Patent Number: 5,949,940
[45] Date of Patent: Sep. 7, 1999

[54] ENHANCED RIBBON STRIPPABILITY USING COATING ADDITIVES

[75] Inventors: John W. Botelho, Corning; Eric H. Urruti, Big Flats, both of N.Y.

[73] Assignee: Corning Incorporated, Corning, N.Y.

[21] Appl. No.: 08/973,282

[22] PCT Filed: May 27, 1997

[86] PCT No.: PCT/US97/08939

§ 371 Date: Dec. 2, 1997

§ 102(e) Date: Dec. 2, 1997

[87] PCT Pub. No.: WO97/46380

PCT Pub. Date: Dec. 11, 1997

Related U.S. Application Data

[60] Provisional application No. 60/019,123, Jun. 3, 1996.

[51] Int. Cl.[6] ............................................. G02B 6/44

[52] U.S. Cl. ................................................. 385/114

[58] Field of Search ........................... 385/100–114, 147

[56] References Cited

U.S. PATENT DOCUMENTS

| | | | |
|---|---|---|---|
| 4,900,126 | 2/1990 | Jackson et al. | 385/114 |
| 5,457,762 | 10/1995 | Lochkovic | 385/114 |
| 5,717,805 | 2/1998 | Stulpin | 385/114 |

*Primary Examiner*—Akm E. Ullah
*Attorney, Agent, or Firm*—Edward V. Charbonneau

[57] ABSTRACT

The optical fiber ribbon includes a plurality of coated, substantially coplanar optical fibers and a ribbon matrix material which maintains the plurality of coated optical fibers in substantially coplanar alignment. Each of the optical fibers includes a core, a cladding layer surrounding and adjacent to the core, and a primary polymeric coating material surrounding and adjacent to the cladding layer. The primary polymeric coating material adheres to the cladding layer to form a cladding layer-primary polymeric coating material interface. Upon application of a longitudinal stripping force at the cladding layer primary polymeric coating material interface, the ribbon matrix material and the primary polymeric coating material are substantially removed from the cladding layer leaving a continuous, smooth residual layer of the primary polymeric coating material with a thickness of less than about 5 $\mu$m.

40 Claims, 2 Drawing Sheets

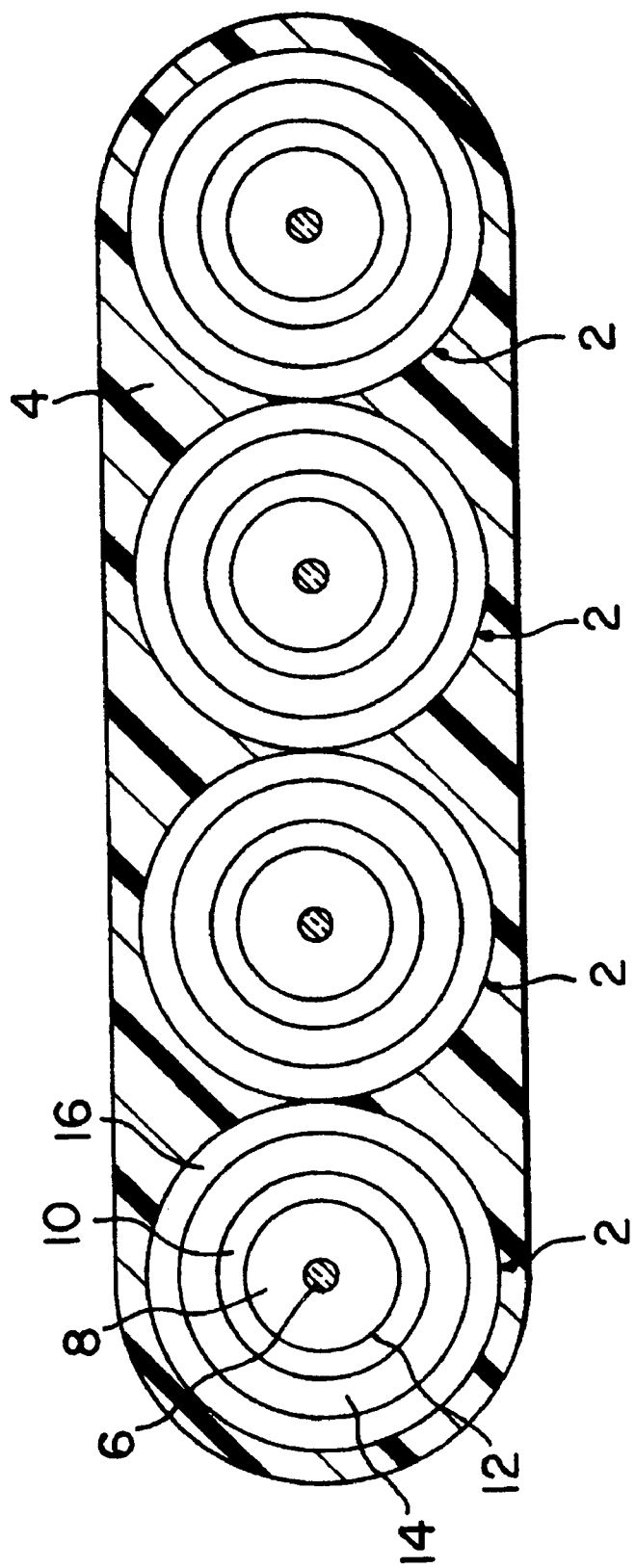

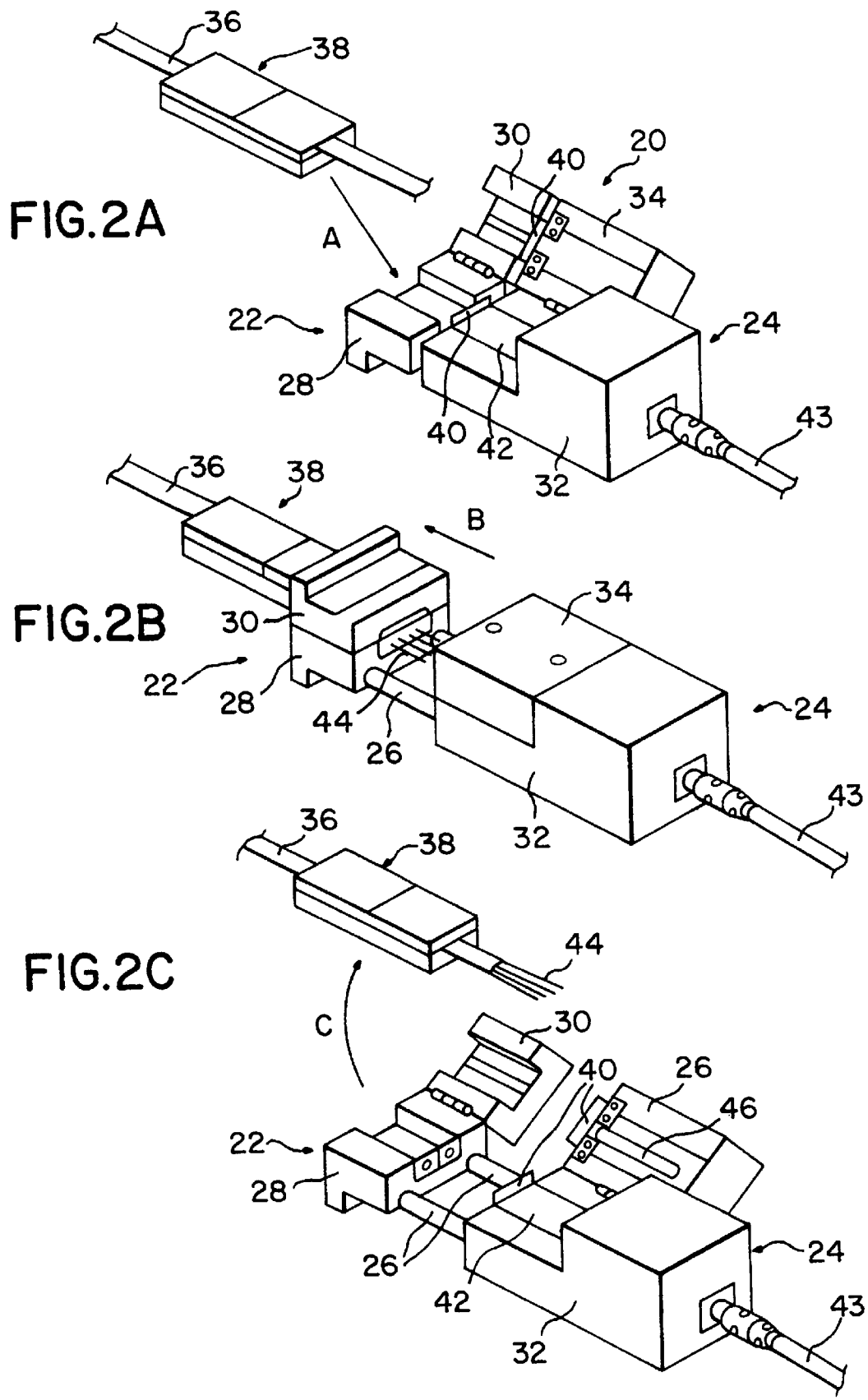

ENHANCED RIBBON STRIPPABILITY USING COATING ADDITIVES

This application claims benefit of Provisional Application No. 60/019,123 Jun. 3, 1996.

FIELD OF THE INVENTION

The present invention relates generally to optical fiber ribbons and, more particularly, to optical fiber ribbons having improved strippability.

BACKGROUND OF THE INVENTION

Optical fiber has now largely replaced copper conductors in long line telecommunications cable and is widely used for data transmission as well. Increased use of fiber optics in local loop telephone and cable TV service is expected, as local fiber networks are established to deliver ever greater volumes of information, in the form of data, audio, and video signals to residential and commercial users. In addition, use of optical fibers in the home and in businesses for internal data, voice, and video communications has begun and is expected to increase.

One of the principal drawbacks to the use of optical fibers is the difficulty in achieving an end-to-end splice with acceptable light transmission loss. For a good connection, the two fibers must be aligned very precisely. At present, this requires a high level of skill by the installer, as well as more time and more expensive tools relative to installations employing metallic conductors. Moreover, this problem, though important in long line transmission fibers, is exacerbated when the fiber is used in local applications, where the number of splices per unit length of fiber installed is greatly increased.

Optical fiber ribbons provide a modular design which simplifies the construction, installation, and maintenance of optical fiber cable by eliminating the need to handle individual fibers. An optical fiber ribbon is constructed of a plurality of optical waveguides, each of which is typically coated with one or more polymeric coatings which serve to protect and cushion the waveguide. The plurality of coated waveguides, each of which is frequently referred to as an optical fiber, is held in a coplanar arrangement by a ribbon matrix material which bonds the individual optical fibers to each other or surrounds the plurality of optical fibers in a common outer jacket or sheathing.

Use of optical fiber ribbons promises to reduce the labor and cost involved in splicing individual optical fibers, because the optical fibers in the ribbon can be spliced by connecting the much larger ribbon, provided that the positions of the optical fibers therein can be precisely fixed and maintained. In one method commonly used to splice ribbons, known as mass fusion splicing, the first step involves the complete removal of all protective polymer coatings and the ribbon matrix material. The process relies upon a V-block to align the individual fibers. The V-block controls angular alignment particularly well so long as the optical waveguide is free of any protrusions, such as non-uniform primary coating material residue, in the region where the optical waveguide contacts the V-block. In addition, the V-block permits precise alignment of the two optical waveguide ends so long as the residual primary coating material on the two ends has the same thickness. Consequently, alignment of the two optical waveguides and the success of the mass fusion splice depend on the removal of the protective coatings. Indeed, if the coating materials cannot be cleanly and easily stripped, splicing operations using the V-block and other similar devices will be seriously hampered.

The need to remove completely the primary coating from the optical waveguide must be balanced with the coating's role of protecting the fiber waveguide from mechanical stresses, moisture infiltration, to which the silica material from which the optical waveguide is typically constructed is particularly susceptible, and other environmental hazards. Protecting the optical waveguide from these hazards is likely to become of increased concern, especially as the use of optical fibers in local data, audio, and video signal transmission grows. In contrast to the comparatively hermetic conditions in long distance cables, where fiber exposure points are far fewer and more sheltered, local optical fibers, having a vastly larger number of splices, are more prone to attack from a variety of environmental hazards. For example, optical fiber connections are commonly made in neighborhood pedestals, which are frequently unsealed, giving insects and animals access to the optical fiber and exposing the optical fiber to moisture and water. Moreover, a substantial percentage of fiber optic cables will find installation in existing pipe chases, including pipe chases containing steam lines, where there are risks to the coatings from thermal damage, alone and in combination with high humidity, to say nothing of direct steam impingement. The ability of the coatings to protect the optical waveguide from mechanical stresses and moisture has been correlated with the strength of the wet adhesive forces between the primary coating and the optical waveguide.

The dual requirements of strong bonding of the primary coating to the waveguide and ease and uniform strippability have presented a difficult challenge in primary coating formulation. The present invention is directed to meeting these dual requirements of adhesion and strippability.

SUMMARY OF THE INVENTION

The present invention relates to an optical fiber ribbon. The optical fiber ribbon includes a plurality of coated, substantially coplanar optical fibers and a ribbon matrix material which maintains the plurality of coated optical fibers in substantially coplanar alignment. Each of the optical fibers includes a core, a cladding layer surrounding and adjacent to the core, and a primary polymeric coating material surrounding and adjacent to the cladding layer. The primary polymeric coating material adheres to the cladding layer to form a cladding layer-primary polymeric coating material interface. Upon application of a longitudinal stripping force at the cladding layer-primary polymeric coating material interface, the ribbon matrix material and the primary polymeric coating material are substantially removed from the cladding layer leaving a continuous, smooth residual layer of the primary polymeric coating material with a thickness of less than about 5 $\mu$m.

The present invention also relates to an optical fiber ribbon which includes a plurality of coated, substantially coplanar optical fibers and a ribbon matrix material which maintains the plurality of coated optical fibers in substantially coplanar alignment. Each of the optical fibers includes a core, a cladding layer surrounding and adjacent to the core, and a primary polymeric coating material surrounding and adjacent to the cladding layer. The primary polymeric coating material includes a silicone.

In another aspect, the present invention relates to a method of stripping an optical fiber ribbon. The method includes providing an optical fiber ribbon which includes a plurality of coated, substantially coplanar optical fibers and a ribbon matrix material which maintains the substantially coplanar alignment of the plurality of coated optical fibers.

Each of the coated, substantially coplanar optical fibers comprises a core, a cladding layer surrounding and adjacent to the core, and a primary polymeric coating material surrounding and adjacent to the cladding layer. The primary polymeric coating material adheres to the cladding layer to form a cladding layer-primary polymeric coating material interface. The method further includes applying a longitudinal stripping force at the cladding layer-primary polymeric coating material interface effective to remove substantially the ribbon matrix material and the primary polymeric coating material from the cladding layer. The primary polymeric coating material is constituted to leave on the cladding layer a continuous, smooth residual layer of the primary polymeric coating material with a thickness of less than about 5 $\mu$m as a result of applying the longitudinal stripping force.

The present invention also relates to a coating composition adapted to provide a primary coating for an optical glass fiber. The coating composition includes a silicone.

The optical fiber ribbons of the present invention allow removal of the primary polymeric coating material from the cladding layer so that the residual primary polymeric coating material left on the cladding layer by the removal process is sufficiently uniform to permit precise alignment of the ribbons. Consequently, the optical fiber ribbons of the present invention allow production of high quality splices using mass fusion splicing techniques. At the same time, the adhesion of the primary coating material to the cladding layer is sufficient to prevent delamination in moist environments and, therefore, to prevent exposure of the cladding layer and core to the destructive effects of moisture and other environmental hazards.

BRIEF DESCRIPTION OF THE DRAWINGS

FIG. 1 is a cross-sectional view of an example of a 4-fiber ribbon according to the present invention.

FIGS. 2A–C are perspective views of a ribbon stripping apparatus engaging and stripping a optical fiber ribbon according to the present invention.

DETAILED DESCRIPTION OF THE INVENTION

The present invention relates to an optical fiber ribbon, a cross-sectional view of which is presented in FIG. 1.

In one aspect, the optical fiber ribbon of the present invention includes a plurality of coated, substantially coplanar optical fibers 2 and a ribbon matrix material 4 which maintains the plurality of coated optical fibers in substantially coplanar alignment. Each of the optical fibers includes a glass core 6, a cladding layer 8 surrounding and adjacent to glass core 6, and a primary polymeric coating material 10 surrounding and adjacent to cladding layer 8. Primary polymeric coating material 10 adheres to cladding layer 8 to form a cladding layer-primary polymeric coating material interface 12. Upon application of a longitudinal stripping force at cladding layer-primary polymeric coating material interface 12, ribbon matrix material 4 and primary polymeric coating material 10 are substantially removed from cladding layer 8 leaving a continuous, smooth residual layer of primary polymeric coating material 10 with a thickness of less than about 5 $\mu$m.

Primary polymeric coating material 10 can, optionally, be surrounded by and adjacent to a secondary polymeric coating material 14. Secondary coating material 14 can be a tight coating or, alternatively, a loose tube coating. Irrespective of the type of secondary coating employed, it is preferred that the surface of secondary coating material 14 be such that tacking does not occur between adjacent convolutions of the fiber, resulting in a jerky payoff from a process spool.

The optical fiber components of the optical fiber ribbon of the present invention can, optionally, also include a coloring material, such as a colored ink coating which identifies each optical fiber in the ribbon. Preferably, the optional ink coating surrounds and is adjacent to the outermost polymeric coating material. Referring again to FIG. 1, where the optical fiber includes the optional secondary polymeric coating material 14, as depicted in FIG. 1, ink coating 16 surrounds and is adjacent to secondary polymeric coating material 14.

The optical fiber contained in the optical fiber ribbon of the present invention includes a core. Suitable fibers include step-index fibers, having a core whose refractive index is constant with distance from the fiber axis, and graded-index fibers, having a core whose refractive index varies with distance from the fiber axis. Any conventional core material, such as those identified in U.S. Pat. No. 4,486,212 to Berkey, which is hereby incorporated by reference, can be used. The core is typically a silica glass having a cylindrical cross section and a diameter ranging from 5 to 10 $\mu$m for single mode fibers and 20 to 100 $\mu$m for multimode fibers. The core can optionally contain varying amounts of other materials, such as oxides of titanium, thallium, germanium, and boron, which modify the core's refractive index. Alternatively, the core can be a plastic material. However, because attenuation loss for plastic-core fibers is large, typically several hundred dB/km, compared to attenuation loss for glass-core fibers, typically less than 10 dB/km, the use of plastic-core fibers is usually limited to very short path lengths.

The core is advantageously surrounded by and adjacent to a cladding layer having a refractive index less than the refractive index of the core. A variety of cladding materials, both plastic and glass (e.g., silica and borosilicate glasses) are used in constructing conventional optical fibers, and any of these materials can be used to form the cladding layer in the optical fiber ribbons of the present invention.

In many applications, the core and cladding layer have a discernable core-cladding boundary. Alternatively, the core and cladding layer can lack a distinct boundary, such as where the core and cladding, generally both made of glass, are diffused into one another to form a graded index fiber. In another arrangement, the cladding layer can be made of a series of glass or plastic layers of varying refractive index. The optical fiber ribbon of the present invention can contain optical fibers which have any of the above core-cladding layer configurations.

The cladding layer is surrounded by and adjacent to a primary polymeric coating material. The primary polymeric coating material is constituted so that, upon application of a longitudinal stripping force at the cladding layer-primary polymeric coating material interface, the ribbon matrix material and the primary polymeric coating material are substantially removed from the cladding layer leaving a continuous, smooth residual layer of the primary polymeric coating material. The thickness of the residual primary polymeric coating material is less than about 5 $\mu$m, preferably less than about 3 $\mu$m, more preferably, less than about 1 $\mu$m.

The magnitude of the stripping force used in effecting the removal is not critical. However, particularly where the number of optical fibers contained in the optical fiber ribbon is great, it is preferred that the longitudinal stripping force be less than about 5000 g and, more preferably, less than about 4000 g. Methods for measuring the longitudinal stripping force are well known to those skilled in the art.

One suitable method for substantially removing the ribbon matrix material, the primary polymeric coating material, the optional secondary polymeric coating material, and the optional ink coating employs Fujikura HJS-01 or Sumitomo JR4A thermal strippers set to 60–140° C. and a 150 $\mu$m blade gap and a stripping rate of 100 mm/min. Typical stripping tools of this type are depicted in FIGS. 2A–2C. Stripping apparatus 20 comprises movable portion 22 and stationary portion 24, slidably engaged with each other along guides 26. Movable portion 22 includes a movable base portion 28 and movable cover 30, hingably attached to movable base portion 28. Stationary portion 24 includes a stationary base portion 32 and stationary cover 34, hingably attached to stationary base portion 32.

In operation, optical fiber ribbon 36 is placed in fiber holder 38, so that about 25 mm to about 30 mm of optical fiber ribbon 36 protrudes from fiber holder 38. With movable cover 30 and stationary cover 34 of stripping apparatus 20 in the open position, as shown in FIG. 2A, fiber holder 38 is placed into stripping apparatus 20 as indicated by arrow A in FIG. 2A. Movable cover 30 and stationary cover 34 are then closed, forcing opposing blades 40 against optical fiber ribbon 36, and causing blades 40 to cut into optical fiber ribbon 36 from opposing sides to a depth equal to half of the blade gap. Closing of stationary cover 34 also forces a portion of optical fiber ribbon 36 against heater 42 which is contained in stationary base portion 32 and which is connected to a power source (not shown) through wire 43. The portion of optical fiber ribbon 36 in contact with heater 42 is heated to the temperature of heater 42, typically between about 5 and 10 seconds, and, then, movable portion 22 is pulled away from stationary portion 24, in a line parallel to guides 26, exposing stripped optical fibers 44, as indicated by arrow B in FIG. 2B. Referring now to FIG. 2C, movable cover 30 and stationary cover 34 are then opened, and fiber holder 38 is removed from stripping apparatus 20, as indicated by arrow C in FIG. 2C. The removed ribbon matrix material, primary polymeric coating material, optional secondary polymeric coating material, and optional ink coating, collectively referred to as tube 46, are retained in stationary portion 24.

The adhesion of the optical fiber's primary polymeric coating material to the cladding layer, as measured by the 180° peel strength value, is preferably from about 50 to about 2 g. Methods for measuring the 180° peel strength are described in ASTM D-903, which is hereby incorporated by reference.

The primary polymeric coating material preferably comprises a silicone. Suitable silicones are polymeric organosilicon compounds containing Si—O—Si linkages and having the general formula $-(R^1R^2Si-O-)_x$, where x is an integer of at least 2, preferably from 2 to $10^5$, and $R^1$ and $R^2$ are the same or different and are alkyl moieties. Preferably, $R^1$ and $R^2$ are unsubstituted C1 to C6 alkyl groups, such as methyl, ethyl, propyl, iso-propyl, butyl, sec-butyl, tert-butyl, pentyl, iso-pentyl, neopentyl, hexyl, 2-methylpentyl, 3-methylpentyl, cyclohexyl, and the like. More preferably, $R^1$ and $R^2$ are each methyl. Suitable silicones include linear, branched, or cyclic siloxanes. One illustrative example of a suitable linear siloxanes is hexamethyldisiloxane. Preferred cyclic siloxanes are those containing at least three silicon atoms, more preferably, from 3 to 6 silicon atoms. These include hexamethylcyclotrisiloxane, octamethylcyclotetrasiloxane ("OMCTS"), decamethylcyclopentasiloxane, dodecamethylcyclohexasiloxane, and mixtures thereof. OMCTS is particularly preferred for use in the optical fiber ribbons of the present invention. The preparation of these and other polymethylcyclosiloxanes is described in U.S. Pat. No. 4,689,420 to Baile et al., which is hereby incorporated by reference.

Preferably, the silicone is present in the primary polymeric coating material in an amount from about 0.25 weight percent to the solubility limit of the silicone in the polymer or polymers which constitute the primary polymeric coating material. Typically, the solubility limit is the greatest silicone concentration which does not cause clouding of the primary polymeric coating material. Particularly preferred concentrations of silicone in the primary polymeric coating material are from about 2 to about 10 weight percent, more preferably, from about 3 to about 7 weight percent.

The primary polymeric coating material preferably includes ethylenically unsaturated, ultraviolet-curable polymers, such as a poly(alkyl alkacrylate or a acrylate-terminated alkacrylate. Suitable poly(alkyl alkacrylate)s include methyl methacrylate, ethyl methacrylate, and the like. Other suitable primary polymeric coating materials, such as those described in U.S. Pat. No. 4,324,575 to Levy, which is hereby incorporated by reference, will be evident to those skilled in the art.

One particularly preferred primary polymeric coating material combines a silicone with the coating material described in U.S. Pat. No. 5,219,896 to Coady et al. ("Coady"), which is hereby incorporated by reference.

Briefly, the particularly preferred coating material comprises: (1) about 30 to about 80 weight percent, based on the total weight of the coating composition, of an acrylate-terminated polyurethane ("acrylated polyurethane") having a number average molecular weight of about 2,500 to about 8,000 daltons; (2) about 20 to about 60 weight percent of an acrylate of an unsubstituted or C7–C10, preferably C8–C9, alkyl substituted phenol that is alkoxylated with a C2–C4 alkylene oxide and contains about 1 to about 5 moles of the oxide per mole of phenol; (3) about 5 to about 30 weight percent of at least one alkyl acrylate having a glass transition temperature ("$T_g$") from about –90° C. to about –45° C., preferably below about –60° C.; and (4) about 2 to about 10 weight percent, preferably about 3 to about 7 weight percent, of a silicone.

The acrylate-terminated polyurethane is the reaction product of a prepolymer, an organic diisocyanate, and a hydroxy acrylate. The prepolymer is a carbon chain that can comprise oxygen and/or nitrogen atoms to which the terminal acrylate functionality is added by use of the diisocyanate. The prepolymer has on average at least about two prepolymer functional groups that are reactive with the isocyanate group, e.g., a hydroxy, mercapto, amine, or similar group. The number average molecular weight of the prepolymer is about 700 to about 2,000, preferably about 800 to about 2,000, daltons. Suitable prepolymers include polycarbonates, and mixtures of polyethers (e.g. poly (propylene oxide) and poly(tetramethylene glycol)) and polycarbonates. Although all of the above-described prepolymers are suitable for use in the optical fiber ribbon of the present invention, when utilized with the acrylate of the alkoxylated phenol, the polycarbonate diols give superior results, especially from the standpoint of hydrolytic and oxidative stability, and thus are preferred.

Polycarbonate diols are conventionally produced by the alcoholysis of diethylcarbonate or diphenylcarbonate with an alkane diol, such as 1,4-butane diol, 1,6-hexane diol, and 1,12-dodecane diol; an alkylene ether diol, such as triethylene glycol and tripropylene glycol; or mixtures thereof. Suitable polycarbonate diols include DURACARB 122, commercially available from PPG Industries and PERMANOL KM10-1733, commercially available from Permuthane, Inc., Massachusetts. DURACARB 122 is produced by the alcoholysis of diethylcarbonate with hexane diol.

A wide variety of diisocyanates alone or in admixture with one another can be utilized to prepare the acrylated polyurethane. Representative diisocyanates include, toluene diisocyanate, methylene diphenyl diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and, preferably, isophorone diisocyanate ("IPDI").

The hydroxy acrylate can be a monoacrylate or a polyacrylate. The reaction of the isocyanate group with a hydroxy group of the hydroxy acrylate produces a urethane linkage which results in the formation of an acrylate terminated urethane. Suitable monohydric acrylates are the hydroxy C2–C4 alkyl acrylates and polyacrylates, such as 2-hydroxyethyl acrylate, 2-hydroxypropyl acrylate, glyceryl diacrylate, and mixtures thereof. The methacrylate counterparts of the above acrylates can also be utilized.

To prepare the acrylated polyurethane, the prepolymer diol, diisocyanate, and hydroxy acrylate (in a mole ratio of about 1:2:2, respectively, to about 5:6:2, respectively) are admixed with a minor amount of a catalyst, such as about 0.03 to about 0.1, preferably about 0.04, weight percent of dibutyl tin dilaurate. A sparge of dry gas, such as dry air, nitrogen, or carbon dioxide, is utilized to ensure there is no moisture present which can adversely affect the reaction. The reaction is conducted at a temperature of about 40° to about 80° C. for a time period sufficient to consume substantially all of the hydroxy functionality of the prepolymer diol and the hydroxy acrylate and the free nitrogen-carbon-oxygen groups ("NCO") of the diisocyanate. Further details relating to the preparation of acrylated polyurethanes are disclosed in Coady, which is hereby incorporated by reference.

The primary polymeric coating material can include small amounts (typically from about 0.5 to about 6 percent) of conventional photoinitiators and inhibitors, adhesion promoters, and stabilizers.

The photoinitiators utilized are conventional components of light curable ethylenically unsaturated coatings. Suitable photoinitiators are aryl ketones, such as benzophenone, acetophenone, diethoxy acetophenone, benzoin, benzil, anthraquinone, and the like. A commercial photoinitiator is illustrated by IRGACURE 184, which is hydroxycyclohexyl phenyl ketone available from Ciba-Geigy Corp., Ardsley, N.Y. When necessary, free radical polymerization can be inhibited by the use of an agent, such as phenothiazine or butylated hydroxytoluene in an amount less than about 0.1 weight percent.

Silane coupling agents are conventional adhesion promoters and typically can be present in an amount of about 1 weight percent. Illustrative silane coupling agents include gamma methacryloxypropyl trimethoxy silane, commercially available from Huls, Bristol, Pa., under the trade designation MEMO and gamma mercaptopropyl trimethoxy silane, which is commercially available from Union Carbide Corp. (Danbury, Conn.) under the designation A-189.

Conventional stabilizers, such as hindered amines, which provide ultraviolet stability for the cured composition, can be present in amounts less than about 1 weight percent. Illustrative stabilizers include bis(2,2,6,6-tetramethyl-4-piperidinyl) sebacate, which is commercially available from Ciba-Geigy Corp., Ardsley, N.Y., under the trade designation TINUVIN 770 and thiodiethylene (3,5-di-tert-butyl-4-hydroxy) hydrocinnamate, also commercially available from Ciba-Geigy Corp. under the trade designation IRGANOX 1035.

Typical coating materials for use in secondary coatings include urethane acrylate liquids whose molecules become crosslinked when exposed to ultraviolet light. Other suitable materials for use in the secondary polymeric coating material, as well as considerations related to selection of these materials, are well known to those skilled in the art and are described in, for example U.S. Pat. No. 4,962,992 to Chapin et al. and U.S. Pat. No. 5,104,433 to Chapin et al. ("Chapin Patents"), which are hereby incporated by reference. Various additives that enhance one or more properties of the coating can also be present, including the above-mentioned additives incorporated in the primary polymeric coating material.

The thickness of the cladding and each of the coatings as well as the diameter of the core are not critical to the practice of the present invention. By way of illustration, a typical diameter of the core and the cladding layer, taken together, is about 125 micrometers for single mode fibers. Each polymeric coating material has a thickness of about 30 micrometers so that the overall diameter of the coated optical fiber is approximately 250 microns.

The optical fiber ribbon of the present invention further includes a ribbon matrix material which maintains the plurality of coated optical fibers in substantially coplanar alignment. The ribbon material can encapsulate the plurality of optical fibers, or, alternatively, the optical fibers can be bonded to each other with the matrix material. The matrix material can be made of a single layer or of a composite construction. Suitable matrix materials include polyvinyl chloride as well as those other materials known to be useful as primary and secondary polymeric coating materials. Preferably, the matrix material is the same type of material as that used in the optional secondary coating.

Production of the optical fiber ribbon of the present invention can be effected by standard methods. In brief, the process involves fabricating the core and cladding layer, coating the cladding layer with the primary polymeric coating material, optionally coating the primary polymeric coating material with a secondary polymeric coating material, optionally disposing an ink coating around the secondary coating material, arranging a plurality of the coated optical fibers in a coplanar configuration, and applying a ribbon matrix material to the fibers so that the planar arrangement is thereafter maintained.

The core and cladding layer are typically produced in a single operation by methods which are well known in the art. Suitable methods include the double crucible method, described, for example, in Midwinter, *Optical Fibers for Transmission*, New York:John Wiley, pp. 166–178 (1979), which is hereby incorporated by reference; rod-in-tube procedures; and doped deposited silica ("DDS") processes (also commonly referred to as chemical vapor deposition ("CVD") processes or vapor phase oxidation ("VPO") processes). A variety of DDS processes are known and are suitable for producing the core and cladding layer used in the optical fiber ribbon of the present invention. They include external CVD, described in, for example, Blakenship et al., "The Outside Vapor Deposition Method of Fabricating Optical Waveguide Fibers," *IEEE J. Quantum Electron.*, 18:1418–1423 (1982), which is hereby incorporated by reference; axial vapor deposition ("AVD") processes, described in, for example, Inada, "Recent Progress in Fiber Fabrication Techniques by Vapor-phase Axial Deposition," *IEEE J. Quantum Electron.*, 18:1424–1431, which is hereby incorporated by reference; and internal CVD (also commonly referred to as modified CVD ("MCVD") or inside vapor deposition ("IVD")), described in, for example, Nagel et al., "An Overview of the Modified Chemical Vapor Deposition (MCVD) Process and Performance," *IEEE J. Quantum Electron.*, 18:459–476 (1982), which is hereby incorporated by reference.

The primary coating material is coated on a glass fiber using conventional processes. The coating process can be carried out on a single fiber or on a plurality of fibers.

It is well known to draw glassy optical fibers from a specially prepared, cylindrical preform which has been locally and symmetrically heated to a temperature of about 2000° C. As the preform is heated, such as by feeding the preform into and through a furnace, a glass fiber is drawn from the molten material. The primary and optional secondary coating materials are applied to the glass fiber after it has been drawn from the preform, preferably immediately thereafter. In general, the primary polymeric coating material, in an uncured or solution form, is applied to the glass fiber, typically by passing the fiber through a pool of the uncured or dissolved primary polymeric coating material. The coating is then cured or the solvent is then removed to produced a cured, coated optical fiber. The method of curing can be thermal or photonic, such as by exposing the coated uncured polymeric coating material to ultraviolet light, depending on the nature of the polymeric coating material and initiator being employed. It is frequently advantageous to apply both the primary and secondary polymeric coating materials, in sequence, during the drawing process. One method of applying dual layers of coating materials to a moving glass fiber is disclosed in U.S. Pat. No. 4,474,830 to Taylor, which is hereby incorporated by reference. Another method for applying dual layers of coating materials onto a glass fiber is disclosed in U.S. Pat. No. 4,851,165 to Rennell et al., which is hereby incorporated by reference. Similarly, the ink coating can be applied.

The coated optical fibers are then disposed in a coplanar arrangement and held in this arrangement while an uncured ribbon matrix material is applied and cured. It may be advantageous, in some instances, to initially prepare a plurality of reels of coated optical fibers and then to produce the optical fiber ribbon in a separate process, particularly if the optimum speeds of fiber drawing and coating and ribbon manufacture are significantly different.

A typical UV-curable ribbon matrix material is a mixture comprising a resin, a diluent, and a photoinitiator. The resin can include a diethylenic-terminated resin synthesized from a reaction of a hydroxy-terminated alkyl acrylate with the reaction product of a polyester of polyether polyol of molecular weight of 1000 to 6000 daltons with an aliphatic or aromatic diisocyanate. Alternatively, the resin can include a diethylenic-terminated resin synthesized from the reaction of glycidol acrylate with a carboxylic-terminated polymer or polyether of molecular weight 1000 to 6000 daltons. The diluent can comprise monofunctional or multifunctional acrylic acid esters having a molecular weight of 100 to 1000 daltons, N-vinylpyrrolidinone, or vinyl caprolactam. Photoinitiators, suitable for use in the ribbon matrix material include ketonic compounds, such as diethoxyacetophenone, acetophenone, benzophenone, benzoin, anthraquinone, and benzyl dimethyl ketal. In a typical composition, the ribbon matrix material can include a resin (50–90 weight %), diluents (5–40 weight %), and a photoinitiator (1–10 weight %). Other suitable additives, such as methacrylates, UV-curing epoxides, or unsaturated polyesters, can also be used.

A variety of methods are known in the art for encapsulating the optical fibers in a ribbon matrix material. Briefly, the plurality of coated optical fibers are conducted side-by-side through a liquid ribbon matrix material, which is advantageously delivered under pressure or under vacuum in a coating chamber of substantially rectangular cross section. More detailed information regarding the production of encapsulated optical fiber ribbons is available in U.S. Pat. No. 4,752,112 to Mayr and U.S. Pat. No. 5,486,378 to Oestreich et al., which are hereby incorporated by reference.

In cases where the ribbon matrix material is the same as the outermost polymeric coating material, the ribbon matrix can be formed by applying a suitable solvent to the outermost polymeric coating material, while adjacent optical fibers are in tangential contact. The solvent dissolves a portion of the outermost polymeric coating material, and, upon evaporation of the solvent, adjacent optical fibers become fused to each other, thus forming the optical fiber ribbon. In this process, solvent drying may be effected by exposure to ambient air, or it may be aided, such as by directing solvent-absorbing gas onto the advancing fiber ribbon. Prior to storage on a reel, the ribbon is advantageously dusted with powder such as calcium stearate, to decrease any residual tackiness that may have resulted from exposure to the solvent. In forming the ribbon matrix material from the outermost polymeric coating material, the solvent must be carefully chosen and applied in controlled quantities and concentrations. If the solvent is too active, it will tend to strip away the outermost polymeric coating material altogether. On the other hand, a weak solvent will not sufficiently dissolve the coating. More details relating to solvent welding as a means of producing a optical fiber ribbon are disclosed in British Patent No. 1,570,624 and U.S. Pat. No. 4,147,407, both to Eichenbaum et al., which are hereby incorporated by reference.

The present invention also relates to a method of stripping an optical fiber ribbon. The method includes providing an optical fiber ribbon which includes a plurality of coated, substantially coplanar optical fibers and a ribbon matrix material which maintains substantially coplanar alignment of the plurality of coated optical fibers. Each of the coated, substantially coplanar optical fibers comprises a glass core, a cladding layer surrounding and adjacent to the glass core, a primary polymeric coating material surrounding and adjacent to the cladding layer, an optional secondary polymeric coating material surrounding and adjacent to the primary polymeric coating material, and an optional ink coating surrounding and adjacent to the secondary polymeric coating material or, in the case where an optional secondary polymeric coating material is not employed, adjacent to the primary polymeric coating material. The primary polymeric coating material adheres to the cladding layer to form a cladding layer-primary polymeric coating material interface. The method further includes applying a longitudinal stripping force at the cladding layer-primary polymeric coating material interface effective to remove substantially the ribbon matrix material and the primary polymeric coating material (as well as the optional secondary polymeric coating material and the optional ink coating if they are present)

from the cladding layer. The ribbon matrix material is constituted to leave a continuous, smooth residual layer of the primary polymeric coating material with a thickness of less than about 5 μm as a result of applying the longitudinal stripping force.

The longitudinal stripping force is provided to the cladding layer-primary polymeric coating material interface by a stripping tool. The stripping tool has a pair of opposing cutting blades and a blade gap equal to or slightly greater than the diameter of the combined core and cladding layer (i.e. equal to or slightly greater than the sum of the core's diameter and twice the cladding layer's thickness). The ribbon is inserted into the stripping tool near one end of the ribbon with the portion of the ribbon which is to have its coatings removed extending beyond the forward edge of the cutting blades, and the blades are brought together until the distance separating them is equal to the blade gap. This action cuts through opposite sides of the ribbon matrix material, the optional ink coating, the optional secondary polymeric coating material, and most of the primary polymeric coating material so that a well defined break in the coating and ribbon matrix materials can be made. While maintained in the closed position, the blades are moved toward the end of the ribbon being stripped, thereby exerting a longitudinal (i.e. parallel to the optical fiber axis) stripping force at the cladding layer-primary polymeric coating material interface. In many cases, the amount of longitudinal stripping force required to remove the coating and ribbon matrix material can be reduced by applying heat, typically in the range of from about 80 to about 110° C. for from less than one second to several minutes, to the surface of that portion of the ribbon matrix material being removed prior to applying the longitudinal force.

Tools particularly well suited to effecting the stripping operation are commercially available. Preferred stripping tools include Fujikura HJS-01 and Sumitomo JR4A thermal strippers set to 60–140° C. and a 150 μm blade gap. Their construction and use are depicted in FIGS. 2A–C and discussed above.

The present invention is further illustrated by the following examples.

EXAMPLES

Example 1
Preparation of Primary Coating Compositions

An acrylate-terminated polyurethane was prepared by admixing 2-hydroxyethyl acrylate, isophorone diisocyanate, dibutyl tin dilaurate, octyl/decyl acrylate, and phenothiazine in the amounts disclosed in Table 1, below, in a suitable vessel. Agitation and a dry air sparge were provided and maintained during the reaction. The temperature of the admixture was elevated to about 40° C. and maintained at that temperature for about 2 hours. Thereafter, the polycarbonate diol, in an amount disclosed in Table 1, was introduced into the vessel and mixed with the admixture. The temperature of the mixture was elevated to about 70° C., and the mixture was maintained at that temperature for a time period sufficient to consume substantially all of the free NCO.

TABLE 1

Acrylate-terminated Polycarbonate Diol-Based Polyurethane

| Component | Parts (by weight) |
| --- | --- |
| Polycarbonate diol | 55.50 |
| 2-hydroxyethyl acrylate | 5.46 |
| Isophorone diisocyanate | 19.01 |
| Octyl/decyl acrylate | 19.94 |
| Dibutyltin dilaurate | 0.06 |
| Phenothiazine | 0.03 |

The polycarbonate diol used in the formulation was PERMANOL KM 10-1733, commercially available from Permuthane Coatings, Peabody, Mass. The octyl/decyl acrylate employed was obtained from Radcure Specialties, Inc., Louisville, Ky. under the tradename ODA.

An aliquot of the above described acrylated polyurethane were admixed with alkoxylated phenol acrylate and phenoxyethyl acrylate in proportions disclosed in Table 2, coating A.

TABLE 2

Primary Coating Compositions

| | Parts by weight | |
| --- | --- | --- |
| Component | Coating A | Coating B |
| Acrylated polyurethane[a] | 62.3 | 57.9 |
| Phenoxyethyl acrylate | 33.1 | 30.8 |
| IRGACURE 184[b] | 2.0 | 1.9 |
| PAPO[c] | 1.0 | 0.9 |
| Silane[d] | 1.0 | 0.9 |
| IRGANOX 1035[e] | 0.5 | 0.5 |
| POLYCAT DBU[f] | 0.1 | 0.1 |
| OMCTS[g] | — | 7.0 |

[a]The acrylated polyurethane prepared in accordance with Table 1 was utilized.
[b]An aryl ketone photoinitiator, commercially available from Ciba-Geigy Corp., Ardsley, NY.
[c]An acylphosphine oxide photoinitiator, commercially available from Ciba-Geigy Corp., Ardsley, NY.
[d]A-189 adhesion promoter, commercially available from Union Carbide Corp., Danbury, CT.
[e]A stabilizer, commercially available from Ciba-Geigy Corp., Ardsley, NY.
[f]An amine catalyst, commercially available from Air Products and Chemicals, Inc., Allentown, PA.
[g]Octamethylcyclotetrasiloxane.

To each of 5 small vials containing composition A, 1, 3, 5, 7, and 10% by weight of OMCTS was added. The vials were capped and repeatedly inverted to mix the components. With the exception of the vial containing 10 weight % of OMCTS, which appeared slightly cloudy, all vials were clear, indicating that OMCTS's solubility limit in primary coating composition A was around 10 weight %. To maximize the effect of the silicone on strippability and to avoid the complications which undissolved OMCTS might cause, primary coating B was formulated to contain 7% OMCTS by weight.

OMCTS-containing primary coating B, the composition of which is disclosed in Table 1, was prepared by adding 7 parts of OMCTS to 93 parts of primary coating composition A and blending the mixture overnight. On inspection in the morning, a non-cloudy solution was observed.

Example 2
Preparation of Optical Fiber Ribbons

Standard 1528 single mode fibers from Corning Incorporated (Corning, N.Y.) were drawn and coated with either primary coating composition A or with primary coating composition B using the coating procedures described in the Chapin Patents, which are hereby incorporated by reference. The fibers were then coated with a secondary coating material like formulation 950-044 and with an LTS ink composition, both available from DSM Desotech, Inc. (Elgin, Ill.).

Employing the method and apparatus described in U.S. Pat. No. 5,486,378 to Oestreich et al., which is hereby incorporated by reference, and a ribbon matrix material (formulation 950-706 from DSM Desotech, Inc. (Elgin, Ill.)), two 12-fiber ribbons were made. One ribbon used the fibers made with primary coating composition A, and the other used the fibers made with primary coating composition B.

Example 3
Single Fiber Evaluation

Single strands of Fibers A and B, respectively containing no and 7% OMCTS by weight, were evaluated for dry and wet strip force (EIA/TIA-455-178) and dry and wet pullout force (ITM-5).

Single fiber data, presented in Table 3, shows that the OMCTS-containing fiber exhibits a reduced pullout force in both the dry and wet state, compared to the fiber without OMCTS. Reduced pullout force is a common characteristic of fibers which exhibit enhanced strip performance in the ribbon form.

TABLE 3

Single Fiber Evaluation Results

| | Fiber A | Fiber B |
|---|---|---|
| Conc. of OMCTS in primary coating | 0% | 7 wt % |
| Dry Strip Force (lbs) | 0.54 | 0.45 |
| Wet Strip Force (lbs) | 0.54 | 0.42 |
| Dry Pullout Force (lbs) | 1.49 | 0.56 |
| Wet Pullout Force (lbs) | 0.79 | 0.85 |
| % Water Absorption | 0.77 | 0.99 |
| % Water Extractable | 0.33 | 0.57 |
| Rm. Temp Water Soak | | |
| 2 days | TYP[1] No delamination | 1 (0.02) |
| 8 days | TYP No delamination | No delamination |
| 14 days | No delamination | No delamination |
| 30 days | No delamination | No delamination |
| 70° C. Water Soak | | |
| 2 days | TYP No delamination | No delamination |
| 8 days | TYP No delamination | 1 (2.3) |
| 14 days | 2 (0.16) | No delamination |
| 30 days | 1 (0.19) | No delamination |
| 30 day 70° C. Water Soak Attenuation | | |
| 1300 nm | TYP < 0.05 dB/km | 0.01 dB/km |
| 1550 nm | TYP < 0.05 dB/km | 0.02 dB/km |

[1]TYP indicates that the value presented is an average of values obtained for this and other samples of the same material To evaluate the effect of OMCTS on adhesion between the cladding layer and the primary coating, each of the fibers was soaked in water at room temperature and at 70° C. for 30 days. MIS tests, which correlate well to the degree of delamination as a result of water soak, were conducted after 2, 8, 14, and 30 days of soaking. MIS results, presented in Table 3, suggest that addition of OMCTS does not inhibit formation of adhesion between the primary coating and the cladding layer. The absence of delamination, is further confirmed by the absence of increased 1300 nm and 1550 nm signal attenuation after soaking the OMCTS fiber at 70° C. for 30 days. If delamination had occurred, significant increases in attenuation in a water soak environment would have been expected. This further demonstrates that the addition of OMCTS did not interfere with the development of primary coating adhesion.

The two coatings also exhibited about the same water absorption and extractable characteristics.

Example 4
Fiber Ribbon Evaluation

For each of the two 12-fiber ribbons, strip force, cleanliness rating, and tube off rating were determined. Ribbon strip force was determined using Fujikura (Alcoa Fujikura Ltd., Duncan, S.C.) thermal strippers set to 100° C. and having a blade gap set to 150 μm. Samples were stripped at 100 mm/min, the strip force was monitored at 200 Hz, and the peak strip force was recorded for each test. Cleanliness was graded on a subjective scale from 1 to 5 where 1 denotes a thoroughly clean strip with no residue, and 5 denotes a residue after stripping which cannot be removed with an alcohol wipe.

The ribbon data is presented in Table 4. As the data shows, a significant decrease in strip force was observed, from 5800 g for the ribbon containing no OMCTS (designated Ribbon A) to 3974 g for the ribbon containing OMCTS (designated Ribbon B). Cleanliness rating for the OMCTS-containing ribbon was significantly lower (indicating a cleaner ribbon) compared to the standard ribbon.

TABLE 4

Fiber Ribbon Evaluation

| | Ribbon A | Ribbon B |
|---|---|---|
| Conc. of OMCTS in primary coating | 0% | 7% by weight |
| Strip Force | | |
| 100° C. & 30 mm/sec | 6203 g | 4053 g |
| 100° C. & 100 mm/sec | 5800 g | 3974 g |
| Cleanliness Rating | | |
| 100° C. & 30 mm/sec | 4.2 | 2.8 |
| 100° C. & 100 mm/sec | 3.8 | 2.6 |
| Tube Off Rating | | |
| 100° C. & 30 mm/sec | 2.2 | 1 |
| 100° C. & 100 mm/sec | 2.6 | 1 |

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An optical fiber ribbon comprising:

a plurality of coated, substantially coplanar optical fibers, each comprising a core, a cladding layer surrounding and adjacent to the core, and a primary polymeric coating material surrounding and adjacent to the cladding layer, wherein the primary polymeric coating material adheres to the cladding layer to form a cladding layer-primary polymeric coating material interface and a ribbon matrix material which maintains substantially coplanar alignment of said plurality of coated optical fibers, wherein, upon application of a longitudinal stripping force at the cladding layer-primary polymeric coating material interface, said ribbon matrix material and the primary polymeric coating material are substantially removed from the cladding layer leaving a continuous, smooth residual layer of the primary polymeric coating material with a thickness of less than about 5 μm.

2. An optical fiber ribbon according to claim 1, wherein the residual layer is less than about 1 μm thick.

3. An optical fiber ribbon according to claim 1, wherein the longitudinal stripping force is less than 5000 g.

4. An optical fiber ribbon according to claim 3, wherein the longitudinal stripping force is less than 4000 g.

5. An optical fiber ribbon according to claim 1, wherein the primary polymeric coating material adheres to the cladding layer with a 180° peel strength of from about 50 to about 2 g.

6. An optical fiber ribbon according to claim 1, wherein said ribbon matrix material surrounds said plurality of coated optical fibers.

7. An optical fiber ribbon according to claim 1, wherein said ribbon matrix material comprises an ethylenically unsaturated, ultraviolet-curable polymer.

8. An optical fiber ribbon according to claim 1, wherein the primary polymeric coating material comprises an ethylenically unsaturated, ultraviolet-curable polymer.

9. An optical fiber ribbon according to claim 8, wherein the primary polymeric coating material comprises a poly (alkyl alkacrylate).

10. An optical fiber ribbon according to claim 1, wherein the primary polymeric coating material comprises an acrylate-terminated polyurethane.

11. An optical fiber ribbon according to claim 1, wherein the primary polymeric coating material further comprises a silicone.

12. An optical fiber ribbon according to claim 11, wherein the silicone is present in the primary polymeric coating material in an amount of from about 2 to about 10 weight percent.

13. An optical fiber ribbon according to claim 12, wherein the silicone is present in the primary polymeric coating material in an amount of from about 3 to about 7 weight percent.

14. An optical fiber ribbon according to claim 11, wherein the silicone is a polymeric organosilicon compound containing Si—O—Si linkages and having the general formula $-\!(R^1R^2Si-\!O\!)_x\!-$, wherein x is an integer from 2 to 100,000 and $R^1$ and $R^2$ are the same or different and are alkyl moieties.

15. An optical fiber ribbon according to claim 11, wherein the silicone is a cyclic siloxane containing from 3 to 6 silicon atoms.

16. An optical fiber ribbon according to claim 15, wherein the silicone is octamethylcyclotetrasiloxane.

17. An optical fiber ribbon according to claim 1, wherein each of said coated, substantially coplanar optical fibers further comprises a secondary polymeric coating material surrounding and adjacent to the primary polymeric coating material.

18. An optical fiber ribbon according to claim 17, wherein each of said coated, substantially coplanar optical fibers further comprises an ink coating surrounding and adjacent to the secondary polymeric coating material.

19. An optical fiber ribbon comprising:
a plurality of coated, substantially coplanar optical fibers, each comprising a core, a cladding layer surrounding and adjacent to the core, and a primary polymeric coating material surrounding and adjacent to the cladding layer, wherein the primary polymeric coating material contains a silicone and
a ribbon matrix material which maintains in substantially coplanar alignment said plurality of coated optical fibers.

20. An optical fiber ribbon according to claim 19, wherein the primary polymeric coating material further comprises a ethylenically unsaturated, ultraviolet-curable polymer.

21. An optical fiber ribbon according to claim 19, wherein the primary polymeric coating material further comprises an acrylate-terminated polyurethane.

22. An optical fiber ribbon according to claim 19, wherein the silicone is present in the primary polymeric coating material in an amount of from about 2 to about 10 weight percent.

23. An optical fiber ribbon according to claim 22, wherein the silicone is present in the primary polymeric coating material in an amount of from about 3 to about 7 weight percent.

24. An optical fiber ribbon according to claim 19, wherein the silicone is a polymeric organosilicon compound containing Si—O—Si linkages and having the general formula $-\!(R^1R^2Si-\!O\!)_x\!-$, wherein x is an integer from 2 to 100,000 and $R^1$ and $R^2$ are the same or different and are alkyl moieties.

25. An optical fiber ribbon according to claim 19, wherein the silicone is a cyclic siloxane containing from 3 to 6 silicon atoms.

26. An optical fiber ribbon according to claim 25, wherein the silicone is octamethylcyclotetrasiloxane.

27. An optical fiber ribbon according to claim 19, wherein said ribbon matrix material surrounds said plurality of coated optical fibers.

28. An optical fiber ribbon according to claim 19, wherein said ribbon matrix material comprises an ethylenically unsaturated, ultraviolet-curable polymer.

29. An optical fiber ribbon according to claim 19, wherein each of said coated, substantially coplanar optical fibers further comprises a secondary polymeric coating material surrounding and adjacent to the primary polymeric coating material.

30. An optical fiber ribbon according to claim 29, wherein each of said optical fibers further comprises an ink coating surrounding and adjacent to the secondary polymeric coating material.

31. A method of stripping an optical fiber ribbon comprising:
providing an optical fiber ribbon comprising a plurality of coated, substantially coplanar optical fibers and a ribbon matrix material which maintains substantially coplanar alignment of the plurality of coated optical fibers, wherein each of the coated, substantially coplanar optical fibers comprises a core, a cladding layer surrounding and adjacent to the core, and a primary polymeric coating material surrounding and adjacent to the cladding layer, wherein the primary polymeric coating material adheres to the cladding layer to form a cladding layer-primary polymeric coating material interface and
applying a longitudinal stripping force at the cladding layer-primary polymeric coating material interface effective to remove substantially the ribbon matrix material and the primary polymeric coating material from the cladding layer, wherein the primary polymeric coating is constituted to leave a continuous, smooth residual layer of the primary polymeric coating material with a thickness of less than about 5 μm as a result of said applying a longitudinal stripping force.

32. A method according to claim 31, wherein the residual layer is less than about 1 μm thick.

33. A method according to claim 31, wherein the longitudinal stripping force is less than 5000 g.

34. A method according to claim 33, wherein the longitudinal stripping force is less than 4000 g.

35. A method according to claim 31, wherein the primary polymeric coating material adheres to the cladding layer with a 180° peel strength of from about 50 to about 2 g.

36. A method according to claim 31, wherein the matrix material surrounds the plurality of coated optical fibers.

37. A method according to claim 31, wherein the primary polymeric coating material further comprises a silicone.

38. A method according to claim 37, wherein the silicone is present in the primary polymeric coating material in an amount of from about 2 to about 10 weight percent.

39. A method according to claim 31, wherein each of the coated, substantially coplanar optical fibers further comprises a secondary polymeric coating material surrounding and adjacent to the primary polymeric coating material and wherein said applying a longitudinal stripping force at the cladding layer-primary polymeric coating material interface removes the secondary polymeric coating material.

40. A method according to claim 39, wherein each of the coated, substantially coplanar optical fibers further comprises an ink coating surrounding and adjacent to the secondary polymeric coating material and wherein said applying a longitudinal stripping force at the cladding layer-primary polymeric coating material interface removes the ink coating.

* * * * *